United States Patent [19]

Goodrich

[11] 3,731,010

[45] May 1, 1973

[54] LATCHING TELEPHONE CUT-OFF SWITCH

[76] Inventor: Robert S. Goodrich, 27901 S. Golden Meadow Drive, Palos Verdes Peninsula, Calif. 90274

[22] Filed: Mar. 15, 1972

[21] Appl. No.: 234,946

[52] U.S. Cl. ....................179/167, 179/158

[51] Int. Cl. ....................H04m 1/19

[58] Field of Search ....................179/158, 167

[56] References Cited

UNITED STATES PATENTS 3,396,244 8/1968 Kowaleski ....................179/167 X 3,504,138 3/1970 Bottos ....................179/167

*Primary Examiner*—William C. Cooper
*Attorney*—Edward A. Sokolski et al.

[57] ABSTRACT

In a telephone cut-off device for a telephone transmitter, which comprises an insert housing disposed between the mouthpiece of the transmitter and the main transmitter housing, having a spring switch means therein and a slidable switch actuator extending outwardly from the device, the improvement which comprises means for locking the actuator in a depressed position relative to the cut-off device causing a displacement of the spring switch while the actuator is so locked.

7 Claims, 6 Drawing Figures

Patented May 1, 1973 3,731,010

2 Sheets-Sheet 2

LATCHING TELEPHONE CUT-OFF SWITCH

In previously filed copending applications Ser. Nos. 64,308 filed Aug. 17, 1970 and 98,984 filed Feb. 17, 1970, U.S. Pat. Nos. 3,699,270 and 3,688,040 respectively, there is described a novel phone cut-off device. The two devices described in the previously filed applications are similar in the general concept and are insertable into a telephone handset unit so as to cut off voice transmission from the transmitter portion thereof. In the units, a spring switch element was present in the devices and served to maintain electrical connection between a contact in the handset portion and a corresponding contact in the capsule unit of the telephone. A slidable switch actuator which existed in the device served to move the spring switch and break the electrical connection thus preventing effective voice transmission through the capsule unit. The spring switch element in effect served to maintain the slidable switch actuator element in a position partially extending outwardly from the device. In this position the spring switch normally will maintain the electrical connection between the two respective contacts. In order to break the contact, the slidable actuator had to be depressed inwardly within the device in both of the aforementioned embodiments. As described in the copending applications, pressure must be maintained on the slidable switch actuator element in order to overcome the force of the spring contact. If the actuator element is not sufficiently depressed, there is a possibility that the connection between contact will not be broken. Further, when the telephone is put down it must be rested so that the actuator element is depressed, if it is desired to have contact broken in these prior devices.

The herein invention is an improvement upon the above described telephone cut-off devices by having means for selectively locking the switch actuator element in a depressed position such that the contact is broken within the telephone transmitter unit and voice transmission is cut off. Two embodiments are utilized. The first embodiment for so locking the switch actuator is comprised of providing a notch formed in a portion of the slidable actuator means which can engage a corresponding wall portion on the housing of the cut-off device unit when the actuator is depressed. The second means comprises providing a rotary actuator arm coextensive with and lying within the face of the slidable actuator. The rotatable actuator arm has an opening therein which engages a fixed pin within the housing. The opening is provided so that upon rotation from a first position to a second position the opening acts as a cam surface relative to the fixed pin and causes the entire actuator to be depressed in a fixed position relative to the housing, thus breaking electrical connection. Upon rotation in the opposite direction, the entire switch actuator element is forced to move outwardly from the device allowing the spring switch to maintain the electrical connection.

It is believed that the invention will be further understood from the following detailed description and drawings in which.

It is to be understood that the embodiments shown in the figures of this drawing comprise the same device shown in application Ser. No. 64,308 filed Aug. 17, 1970, the only difference being the constructional details of the switch actuator portion and a portion of the housing of the device which cooperates therewith. It should be readily apparent that the same concepts shown in the figures of the herein application are equally applicable to the modification of the phone cut-off device shown in application Ser. No. 98,984 filed Dec. 17, 1970. As indicated, the herein invention comprises an improvement upon the aforementioned devices in that it provides a means for locking the actuator element in a position where voice transmission is prevented so that the user thereof does not have to maintain continuous pressure with a thumb or other portion of the hand on the switch actuator during a period of time when it is desired to cut off voice transmission.

Figure 1:
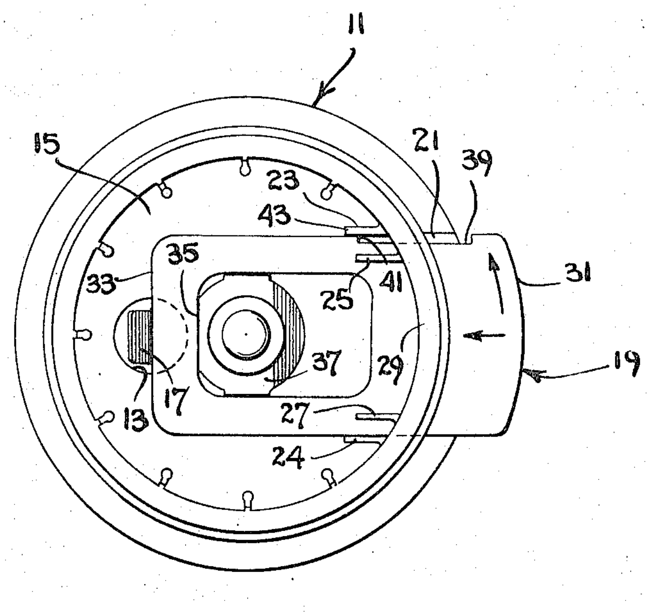
FIG. 1 is a top plan view of a first embodiment of the invention showing the switch actuator portion thereof in a normal position.
Figure 2:
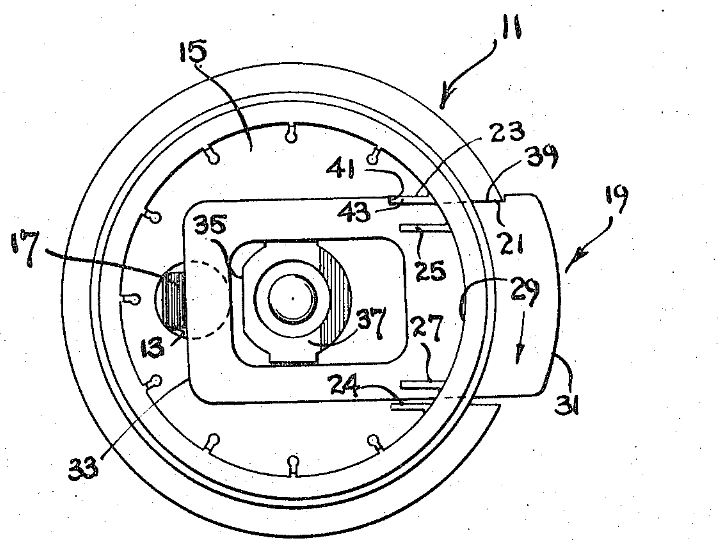
FIG. 2 is a top plan view of the device of FIG. 1 showing a switch actuator in a depressed position wherein the voice transmission will be cut off in the unit.

Turning to FIGS. 1 and 2 there is seen a first embodiment of the herein invention wherein a housing 11 for the phone cut-off device is shown. An opening 13 is provided in an intermediate surface 15 of the device. Through the opening there extends a spring contact element 17. A slidable actuator element 19 is provided which extends through an opening 21 in the housing 11. The actuator 19 is slidable relative to the device and is confined between two side walls 23 and 24 integrally formed and extending upwardly from the surface 15. Additionally, two fingers 25 and 27 are provided extending from a side wall 29 which overlie the actuator element 19 and serve to confine it between the fingers 25 and 27 and the surface 15.

The slidable actuator element 19 is provided with a first outer end 31 and an opposite inner end 33 which engages the spring switch element 17. The force of the spring 17 maintains the slidable actuator element 19 in a position shown in FIG. 1 where it is retained by a surface 35 provided on an inner hub element 37. In this position, as indicated, the spring switch element 17 allows electrical connection to be maintained.

When it is desired to cut off voice communication, the slidable switch element is depressed to the position shown in FIG. 2 in accord with the arrow directions of FIG. 1, wherein together with the depression inwardly of the element 19 it is also forced to one side where a notched area 39 therein can engage side wall portion 23.

In the position of FIG. 1, the notched area 39 is not coalignable to engage the wall 23. As seen, an end surface 41 of the notch 39 is disposed adjacent the wall 23 and thus is prevented from engagement therewith. On the other hand, when the element 19 is depressed within the housing 11 as shown in FIG. 2 and slid sideways in accord with an arrow as shown in FIG. 1, portion 41 can move past the end 43 of the wall 23 so that the wall 23 is seated within the recess 39. The portion 41 then abuts against an end portion 43 of the wall and is retained by the wall from moving outwardly from the housing 11. In other words, the end portion 43 of the wall retains the portion 41 of the recess when the actuator is so depressed and moved sideways thus locking it in the position shown in FIG. 2.

Thus, it can be seen that the herein improvement comprises a simple means, namely the providing of a notch 21 in the side of the slidable actuator element 19 and allows one to lock it in place when depressed by merely sliding it to one side. To unlock the actuator, one merely slides the actuator in the opposite direction as shown by the arrow in FIG. 2 which disengages the slot 39 and particularly the abutting wall portions 41 and 43 such that the force of the spring 17 pushes the actuator element outwardly to the initial position of FIG. 1.

Figures 3, 4, 6:
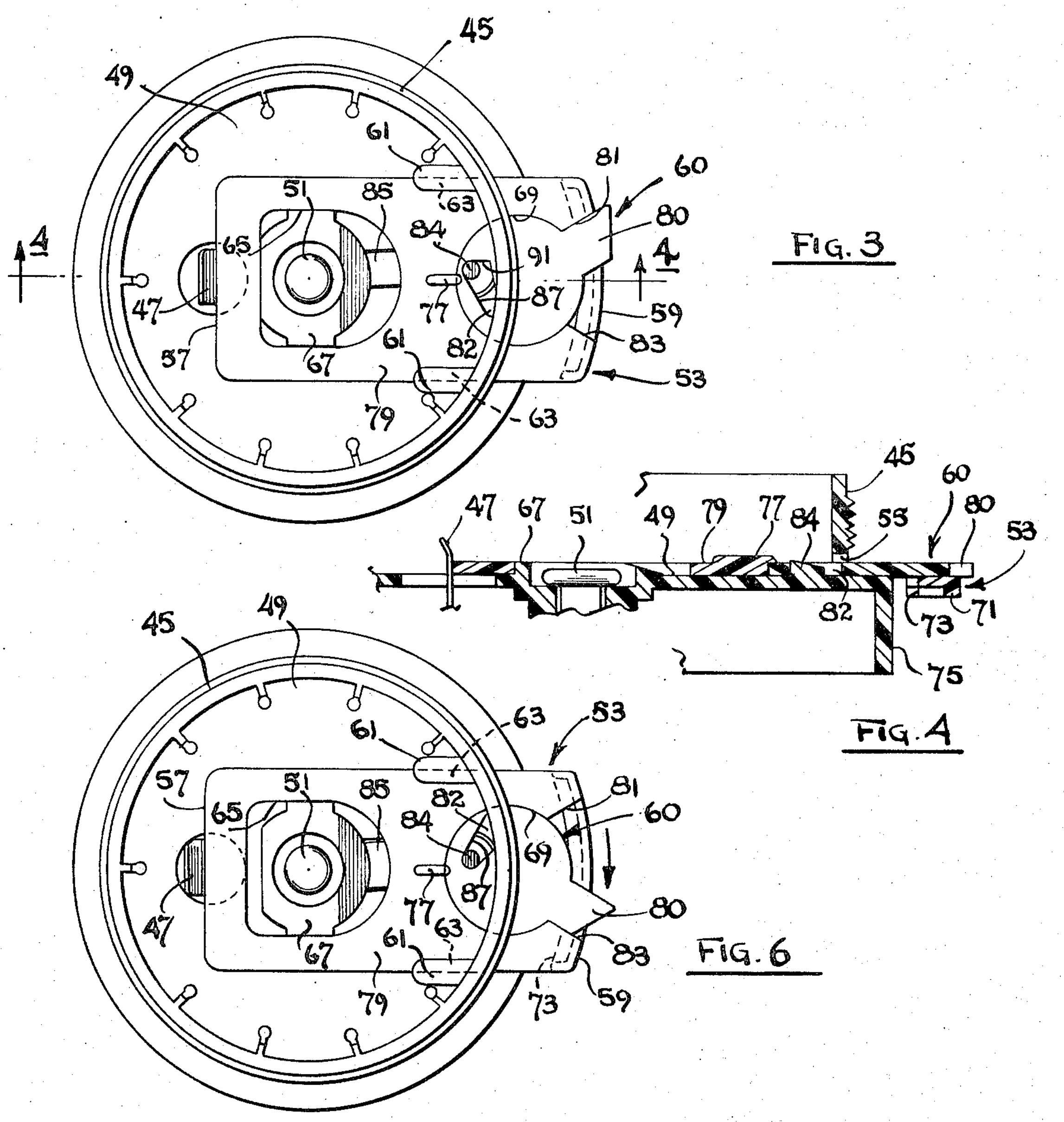
FIG. 3 is a top plan view of the device of a second embodiment of the invention with a switch actuator thereof in a normal position.
FIG. 4 is a cross sectional view taken along line 4—4 of FIG. 3.
FIG. 6 is a top plan view of the embodiment of FIG. 3 showing the switch actuator in a depressed position wherein voice transmission would be cut off in a telephone transmitter.

Turning to FIGS. 2–6 there is seen a second embodiment of the herein invention which once again provides a means for locking the actuator mechanism of the device in a voice cut-off position. As shown, a housing 45 is provided having generally the same construction as the housing in FIGS. 1 and 2. The housing has a spring switch 47 therein and an intermediate surface 49 through which the spring switch 47 protrudes, as particularly seen in FIG. 4. Additionally, as seen in FIG. 4, the center contact element 51 provides electrical connection between corresponding center contacts in a capsule unit and handset of a telephone transmitter.

Switch actuator 53 passes through an opening 55 in the wall 45 of the housing. One inner end 57 of the switch actuator engages spring 47 while an opposite outer end 59 serves to support a rotatable element 60 which serves as the means for locking and unlocking the device. The actuator 53 is slidably supported between two side wall portions 61 on either side thereof integrally formed with the intermediate surface 49. The side wall portions have over-hanging lip portions 63 which overlie the actuator and serve to sandwich it between the lip portion 63 and the intermediate surface 49. The aforegoing arrangement of the side walls 61 and lip portions 63 can be utilized additionally in embodiments in FIGS. 1 and 2 in place of the particular arrangement as shown therein to maintain the actuator relative to the intermediate surface of the device.

Figure 5:
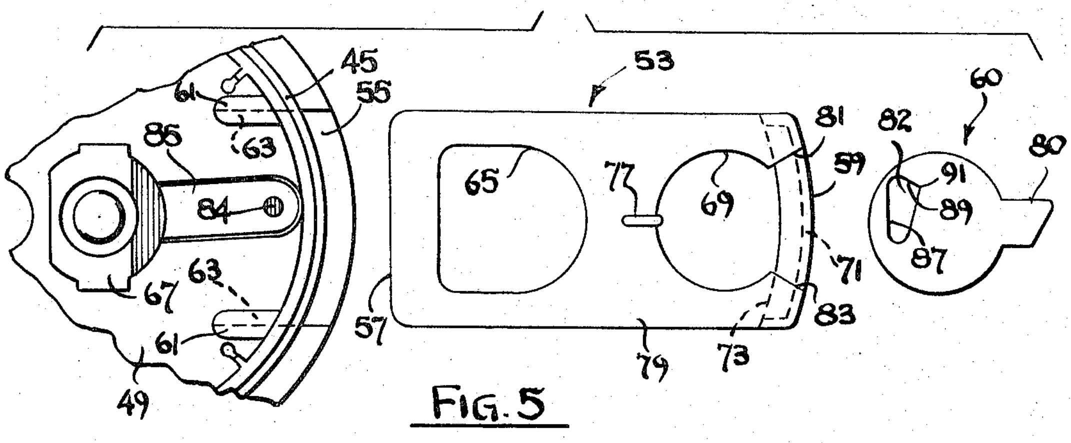
FIG. 5 is an exploded view of the switch actuator portion of the device of the embodiment of FIG. 3.

The actuator element 53 is particularly seen in the details of FIG. 5, where it is shown that the actuator has two apertures provided therein. A first aperture 65 surrounds the center portion 67 formed on the housing 45 of the device. A second aperture 69 is provided in the element 53 in which is seated the rotatable element 60. The rotatable element 60 is of the same thickness as the element 53 so that when positioned therein as seen in FIG. 3, the element 60 is coextensive with the surface of the overall actuator element 53. In order to secure the rotatable element 60 in place relative to the actuator 53, the actuator element 53 has integrally formed therewith and downwardly depending therefrom at its outer end 59, a portion 71 which serves a dual function of supporting a portion of the rotatable element 60 and also serving as a stop means to prevent the actuator from being pushed too far into the element. This is accomplished when a wall 73 of the portion 71 abuts against a corresponding outer wall 75 on the housing of the cut-off device. To additionally aid in maintaining the rotatable element 60 in place within the opening 69 of the actuator element, there is provided a tab 77 that is formed co-extensive with an upper surface 79 of the actuator and overlies a portion of the rotatable element 60. Thus, in effect, the rotatable element 60 will be sandwiched between the tab 77 on one side thereof, and the portion 71 of the actuator on the opposite side thereof.

The opening 69 in the slidable actuator element 53 is generally circular so that the circular rotatable element 60 can rotate therein. The element 60 has an extension or lever arm portion 80 which overlies the portion 71 of the actuator and slides thereon between end wall portions 81 and 83. The rotatable element 60 is provided with an aperture 82 therein which engages a pin 84. The pin 84 is disposed on a flexible arm portion 85 extending from the center of the center portion 67. The flexible arm 85 allows the pin to be depressed relative to the overall actuator 53 as it is pushed into the device to assemble the elements and allow the pin 84 to thus be positioned within the opening 82 in the rotatable portion 60.

When the arm 80 is rotated to the position as shown in FIG. 6, cam surface 87 of the opening 82 moves relative to the fixed pin 84. This action either causes the actuator element 53 to move inwardly within the device to lock the actuator element in place to cut off voice transmission. Rotation in an opposite direction from the position shown in FIG. 6 unlocks the device. By providing a second cam surface 89 on the opening 82 one can merely depress the actuator element without locking it whereby the pin 84 would move along surface 89 from surface 87 to the outermost point 91. Thus, one can either lock the actuator element in place or merely manually keep it in a depressed cut-off position, as desired.

I claim:

1. In a telephone cut-off device for a telephone transmitter comprising an insert housing disposable between a mouthpiece portion of the transmitter and the main transmitter housing, said cut-off device having a spring switch means therein and a slidable switch actuator extending from adjacent said switch outwardly of said insert housing, the improvement which comprises:

means for locking said slidable actuator in a depressed position relative to said insert housing to cause a displacement of said spring contact while said actuator is so locked.

2. The improvement of claim 1 wherein:

said actuator is a generally flat planar element having elongated sides in sliding engagement with said housing and having a notched portion in at least one of said elongated sides, said notched portion capable of engaging a corresponding portion of said housing when said actuator is depressed to lock said actuator.

3. The improvement of claim 2 wherein:

said housing is provided with a retaining wall portion adjacent said actuator side having said notched area, whereby when said actuator is depressed, said wall portion becomes coalignable with said notched area whereby said wall portion can be seated in said notched area when said actuator is forced toward said wall portion.

4. The improvement of claim 1 wherein:

said actuator has a rotatable element therein, at least a portion of said rotatable element extending outwardly from said housing whereby rotation of said element causes said actuator to move inwardly toward said housing and lock in place at an inwardly disposed position.

5. The improvement of claim 4 wherein:

said actuator and said rotatable element are both generally flat planar elements, said rotatable element being coextensively disposed in an aperture provided in said actuator.

6. The improvement of claim 5 wherein:

said housing is provided with a fixed pin disposed therein, and said rotatable element has an opening therein having a cam surface alongside thereof, such that said pin is disposed in said opening adjacent said cam surface whereby rotation of said element causes movement of said cam surface relative to said pin to move said actuator relative to said housing.

7. The improvement of claim 6 wherein:

said rotatable element has a lever arm extending thereon and affixed thereto, whereby movement of said arm can effect movement of said element.

* * * * *